United States Patent
Nakamura et al.

(12)

(10) Patent No.: US 6,433,047 B2
(45) Date of Patent: Aug. 13, 2002

(54) POLYAMIDE COMPOSITION

(75) Inventors: Koji Nakamura; Yutaka Yamaguchi, both of Yamaguchi (JP)

(73) Assignee: UBE Industries, Ltd., Yamaguchi (JP)

( * ) Notice: Subject to any disclaimer, the term of this patent is extended or adjusted under 35 U.S.C. 154(b) by 0 days.

(21) Appl. No.: 09/892,335

(22) Filed: Jun. 27, 2001

(30) Foreign Application Priority Data

Jul. 7, 2000 (JP) .................................. 2000-206098

(51) Int. Cl.$^7$ ................................................ C08K 5/15
(52) U.S. Cl. ...................................................... 524/108
(58) Field of Search .......................................... 524/108

(56) References Cited

U.S. PATENT DOCUMENTS

| 4,795,781 A | | 1/1989 | Miyamoto et al. | |
| 4,822,522 A | * | 4/1989 | Tajima et al. ................ | 252/400 |
| 5,340,884 A | * | 8/1994 | Mills et al. .................. | 525/425 |
| 5,424,104 A | | 6/1995 | Amimoto et al. | |
| 6,169,161 B1 | * | 1/2001 | Tachibana et al. .......... | 528/310 |

FOREIGN PATENT DOCUMENTS

| EP | 0 322 891 A2 | 7/1989 |
| EP | 0 479 560 A2 | 4/1992 |
| JP | 59-231089 A | 12/1984 |
| JP | 4-28727 A | 1/1992 |
| JP | 7-268209 A | 10/1995 |
| JP | 10204175 A | 8/1998 |
| WO | WO 91/04299 A1 | 4/1991 |

OTHER PUBLICATIONS

Lanska, Bozena "Stabalization of polyamides. 1. The efficiency of antioxidants in polyamide 6", *Polym. Degrad. Stab.*, 53(1), pp. 89–98 (1996).

* cited by examiner

*Primary Examiner*—Kriellion A. Sanders
(74) *Attorney, Agent, or Firm*—Akin, Gump, Strauss, Hauer & Feld, L.L.P.

(57) ABSTRACT

A polyamide composition for film formation which deteriorates little in mechanical properties or transparency even when subjected to high-temperature retortion and can be satisfactorily formed into films is described, which comprises (A) 100 parts by weight of a polyamide mixture comprising two or more polyamides differing in terminal group concentration and (B) from 0.01 to 1.0 part by weight of a hydroxyphenyl-propionate represented by formula (1), wherein the polyamide mixture (A) comprising two or more polyamides differing in terminal group concentration has a terminal amino group concentration of from $2.0 \times 10^5$ to $7.0 \times 10^{-5}$ eq/g and a terminal carboxyl group concentration of from $1.5 \times 10^{-5}$ to $4.0 \times 10^{-5}$ eq/g, the terminal amino group concentration being higher than the terminal carboxyl group concentration.

6 Claims, No Drawings

POLYAMIDE COMPOSITION

FIELD OF THE INVENTION

The present invention relates to a polyamide composition which comprises a specific amount of a polyamide mixture comprising two or more polyamides differing in terminal group concentration and a specific amount of a specific antioxidant. The invention further relates to a polyamide film for food packaging obtained from the composition. More particularly, the invention relates to a polyamide composition suitable for use in producing a film satisfactory in practical properties, e.g., the property of deteriorating little in mechanical properties or transparency upon retortion. This polyamide composition is suitable for use as a polyamide film for food packaging, especially a packaging film for retort pouch foods.

BACKGROUND OF THE INVENTION

Polyamide films are excellent in various properties including gas barrier properties, toughness, freedom from pinholes, heat resistance, and oil resistance. Because of this, polyamides are used as packaging films, in particular, used as a base of single-layer films or laminate films or as a constituent material for multilayered films formed by coextrusion with other resins mainly in the field of food packaging.

In the step of packaging foods such as uncooked noodles, cooked foods, and salted vegetables, retortion has come to be frequently conducted in which the packages are treated for sterilization at a high temperature and a high humidity for the purpose of enabling the contents to be stored over long. Recently, higher temperatures of about 130° C. tend to be used for the retortion. Films for food packaging are hence required not to change in mechanical properties or transparency upon treatment with hot water of steam having a temperature of about 130° C.

There have been cases where polyamide films, when subjected to retortion under the conditions of a high temperature of about 130° C. and a high humidity, suffer a considerable decrease in mechanical properties, in particular tensile strength, or suffer blushing to have impaired transparency.

Under these circumstances, investigations are being made in order to develop a polyamide which deteriorates little in mechanical properties, transparency, etc. upon high-temperature high-humidity retortion.

For example, a technique has been proposed in which a polyester film is laminated to a surface of a polyamide film so as to prevent the polyamide film from being directly exposed to a high-temperature high-humidity atmosphere. However, not only the properties of the polyamide film itself remain unimproved, but also this technique has drawbacks in productivity because the production steps necessitate a prolonged time period or are complicated.

JP-A-4-28727 (the term "JP-A" as used herein means an "unexamined published Japanese patent application") discloses a packaging film for retort pouch foods which comprises a specific polyamide resin modified with terminal groups. However, even this polyamide film may be impaired in mechanical properties or transparency through retortion according to the conditions therefor and hence are usable in limited applications.

JP-A-7-268209 discloses a packaging film for retort pouch foods which comprises a polyamide composition containing a specific antioxidant. This polyamide film, however, is insufficient in mechanical properties and transparency after retortion.

Furthermore, JP-A-59-231089 discloses a polyamide composition containing a hydroxyphenylpropionate. However, no data are given therein on properties of this polyamide composition. In addition, neither a description concerning film uses nor a suggestion on influences of retortion on practical properties is given therein.

SUMMARY OF THE INVENTION

The present inventors made investigations in order to develop a polyamide for use as a material for a film which deteriorates little in mechanical properties, transparency, etc. upon retortion. As a result, it has been found that the object of the invention is accomplished with a polyamide composition comprising a polyamide mixture comprising two or more polyamides differing in terminal group concentration and a specific antioxidant. The invention has been completed based on this finding.

The invention provides, according to the first aspect thereof, a polyamide composition comprising
(A) 100 parts by weight of a polyamide mixture comprising two or more polyamides differing in terminal group concentration and
(B) from 0.01 to 1.0 part by weight of a hydroxyphenylpropionate represented by formula (1), wherein the polyamide mixture (A) comprising two or more polyamides differing in terminal group concentration has a terminal amino group concentration of from $2.0 \times 10^{-5}$ to $7.0 \times 10^{-5}$ eq/g and a terminal carboxyl group concentration of from $1.5 \times 10^{-5}$ to $4.0 \times 10^{-5}$ eq/g, the terminal amino group concentration being higher than the terminal carboxyl group concentration,

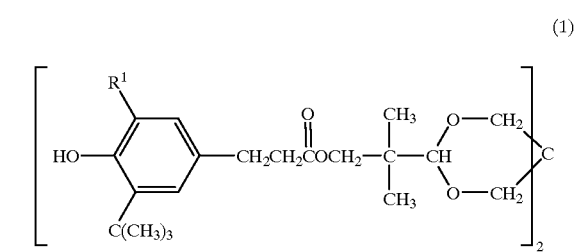

(1)

wherein $R^1$ represents an alkyl group having 1 to 3 carbon atoms.

The invention further provides, according to the second aspect thereof, a polyamide film for food packaging obtained from the polyamide composition described above.

DETAILED DESCRIPTION OF THE INVENTION

The invention will be explained below in detail.

The polyamides differing in terminal group concentration which constitute the polyamide mixture (A) used in the invention are produced by polymerizing or copolymerizing as a starting material a three-membered or higher lactam, an amino acid, or a nylon salt formed from a diamine and a dicarboxylic acid. This (co)polymerization is conducted by a known method such as, e.g., melt polymerization, solution polymerization, or solid-state polymerization in the presence or absence of a specific amount of an amine or an amine/carboxylic acid mixture. Examples of the terminal group structures of the polyamides constituting the polyamide mixture include amino, carboxyl, and hydrocarbon groups having 1 to 22 carbon atoms.

Examples of the three-membered or higher lactam include ε-caprolactam, ω-enantholactam, ω-laurolactam, α-pyrrolidone, and α-piperidone. Examples of the amino acids include 6-aminocaproic acid, 7-aminoheptanoic acid, 9-aminononanoic acid, 11-aminoundecanoic acid, and 12-aminododecanoic acid.

Examples of the diamine for constituting the nylon salt include aliphatic amines such as tetramethylenediamine, hexamethylenediamine, heptamethylenediamine, octamethylenediamine, nonamethylenediamine, decamethylenediamine, undecamethylenediamine, dodecamethylenediamine, and 2,2,4- or 2,4,4-trimethylhexamethylenediamine, alicyclic diamines such as 1,3- or 1,4-bis(aminomethyl)cyclohexane, isophoronediamine, piperazine, bis(4-aminocyclohexyl)methane, and 2,2-bis(4'-aminocyclohexyl)propane, and aromatic diamines such as m-xylylenediamine and p-xylylenediamine.

Examples of the dicarboxylic acid for constituting the nylon salt include aliphatic dicarboxylic acids such as malonic acid, succinic acid, glutaric acid, adipic acid, pimelic acid, suberic acid, azelaic acid, sebacic acid, and undecanedioic acid and alicyclic and aromatic dicarboxylic acids such as 1,4-cyclohexanedicarboxylic acid, terephthalic acid, isophthalic acid, and xylylenedicarboxylic acid.

In the case where a specific amount of an amine or an amine/carboxylic acid mixture is used in producing the polyamides differing in terminal group concentration for use in the invention, the amine or the amine/carboxylic acid mixture can be added at any desired stage of the polymerization reaction. It is however preferred to add the amine or the mixture in the initial state of the polymerization reaction.

The amount of the amine or amine/carboxylic acid mixture to be added is suitably determined in a known manner while taking account of the terminal amino group concentration, terminal carboxyl group concentration, and relative viscosity of each polyamide to be produced. In general, the amine or the amine/carboxylic acid mixture is added in an amount of from 1 to 25 meq, preferably from 3.5 to 18 meq, per mol of the starting material for polyamides, such as a three-membered or higher lactam, an amino acid, or a nylon salt.

Examples of the amine to be added include aliphatic amines such as methylamine, ethylamine, propylamine, butylamine, pentylamine, hexylamine, heptylamine, octylamine, 2-ethylhexylamine, nonylamine, decylamine, and undecylamine, alicyclic monoamines such as cyclohexylamine and methylcyclohexylamine, aliphatic monoamines such as benzylamine and P-phenylmethylamine, sym'etric secondary amines such as N,N-dimethylamine, N,N-diethylamine, N,N-dipropylamine, N,N-dibutylamine, N,N-dihexylamine, and N,N-dioctylamine, mixed secondary amines such as N-methyl-N-ethylamine, N-methyl-N-butylamine, N-methyl-N-dodecylamine, N-methyl-N-octadecylamine, N-ethyl-N-hexadecylamine, N-ethyl-N-octadecylamine, and N-propyl-N-hexadecylamine, aliphatic diamines such as ethylenediamine, trimethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, tridecamethylenediamine, hexadecamethylenediamine, octadecamethylenediamine, and 2,2,4- or 2,4,4-trimethylhexamethylenediamine, alicyclic diamines such as cyclohexanediamine, methylcyclohexanediamine, 1,3- or 1,4-bis (aminomethyl) cyclohexane, isophoronediamine, piperazine, bis(4,4'-aminocyclohexyl)methane, and 2,2-bis(4'-aminocyclohexyl)propane, and aromatic diamines such as m-xylylenediamine and p-xylylenediamine.

Examples of the carboxylic acid include aliphatic monocarboxylic acids such as acetic acid, propionic acid, butyric acid, valeric acid, caproic acid, enanthic acid, capric acid, undecanoic acid, lauric acid, tridecanoic acid, palmitic acid, and stearic acid, alicyclic monocarboxylic acids such as cyclohexanecarboxylic acid and methylcyclohexanecarboxylic acid, aromatic monocarboxylic acids such as benzoic acid, toluic acid, ethylbenzoic acid, and phenylacetic acid, aliphatic dicarboxylic acids such as malonic acid, succinic acid, glutaric acid, adipic acid, pimelic acid, suberic acid, azelaic acid, sebacic acid, undecanedioic acid, dodecanedioic acid, hexadecanedioic acid, hexadecenedioic acid, octadecanedioic acid, octadecenedioic acid, eicosanedioic acid, eicosenedioic acid, docosanedioic acid, diglycolic acid, and 2,2,4-trimethyladipic acid, alicyclic dicarboxylic acids such as 1,4-cyclohexanedicarboxylic acid, and aromatic dicarboxylic acids such as terephthalic acid, isophthalic acid, phthalic acid, m-xylylenedicarboxylic acid, and p-xylylenedicarboxylic acid.

The polyamide mixture (A) has a terminal amino group concentration of from $2.0 \times 10^{-5}$ to $7.0 \times 10^{-5}$ eq/g, preferably from $3.0 \times 10^{-5}$ to $6.5 \times 10^{-5}$ eq/g, and a terminal carboxyl group concentration of from $1.5 \times 10^{-5}$ to $4.0 \times 10^{-5}$ eq/g, preferably from $2.0 \times 10^{-5}$ to $3.5 \times 10^{-5}$ eq/g-Furthermore, the terminal amino group concentration of the polyamide mixture is higher than the terminal carboxyl group concentration thereof. Since the polyamide mixture (A) comprises two or more polyamides differing in terminal group concentration, the terminal amino group concentration and terminal carboxyl group concentration of the polyamide mixture (A) are determined by the terminal amino group concentration and terminal carboxyl group concentration of each constituent polyamide and by the proportions of these.

If the polyamide mixture (A) does not satisfy any of the requirements shown above, for example, if the terminal amino group concentration or terminal carboxyl group concentration of the polyamide mixture (A) is outside the range shown above or the terminal carboxyl group concentration thereof is higher than the terminal amino group concentration thereof, then there are cases where the polyamide film suffers a considerable decrease in mechanical properties or transparency through retortion.

The polyamide mixture (A) has a relative viscosity as measured in accordance with JIS K 6810:1977 of generally from 2.0 to 5.0, preferably from 2.5 to 4.0. The relative viscosity of the polyamide mixture (A) is determined by the relative viscosity of each of the polyamides constituting the polyamide mixture and by the proportions of these. If the relative viscosity of the polyamide mixture is lower than 2.0, the polyamide film obtained from the composition has impaired mechanical properties. On the other hand, if the relative viscosity thereof exceeds 5.0, the composition has too high a melt viscosity, making it difficult to conduct film formation and to obtain a smooth film.

In constituting the polyamide mixture, the two or more polyamides differing in terminal group concentration can be mixed in any desired proportion as long as the resultant polyamide mixture satisfies the above-described specific requirements concerning terminal amino group concentration and terminal carboxyl group concentration.

A polyamide mixture comprising polyamides differing in terminal group concentration at least in some degree is preferred as the polyamide mixture (A) to a polyamide mixture comprising polyamides which are alike in terminal group concentration. For example, such a preferred polyamide mixture is one prepared by mixing polyamides which differ in terminal amino group concentration by at least $1.0\times10^{-5}$ eq/g, preferably by at least $2.0\times10^{-5}$ eq/g, more preferably by at least $3.0\times10^{-5}$ eq/g.

From the standpoint of accomplishing the object of the invention, at least one of the polyamides constituting the polyamide mixture (A) is preferably an amino-rich polyamide in which the difference between the terminal amino group concentration and the terminal carboxyl group concentration is $10\times10^{-5}$ eq/g or larger, preferably $2.0\times10^{-5}$ eq/g or larger.

From the standpoint of ease of mixing and ease of film formation, the polyamides constituting the polyamide mixture are preferably of the same kind. For example, it is preferred to use polyamides which each are nylon-6, a nylon-6/nylon-12 copolymer, a nylon-6/nylon-6,6/nylon-12 copolymer, or the like.

It is possible to obtain a single polyamide which has terminal group concentrations and a relative viscosity within the same respective ranges as the polyamide mixture for use in the invention. However, there are cases where use of such a single polyamide results not only in deterioration in mechanical properties or transparency through retortion but in phenomena including one in which during continuous film production, many gel particles come to generate as the film production time is prolonged, although the reasons for such phenomena are unclear. It is hence difficult to accomplish the object of the invention with a single polyamide.

The hydroxyphenylpropionate (B) represented by formula (1) (hereinafter referred to simply as hydroxyphenylpropionate) to be used in the invention can be produced by reacting a 3-(3-alkyl-5-t-butyl-4-hydroxyphenyl)propionic acid or a reactive derivative thereof, e.g., the acid chloride or acid anhydride thereof, with 3,9-bis(1,1-dimethyl-2-hydroxyethyl)-2, 4,8,10-tetraoxa-spiro[5.5]undecane or a derivative thereof by a known method.

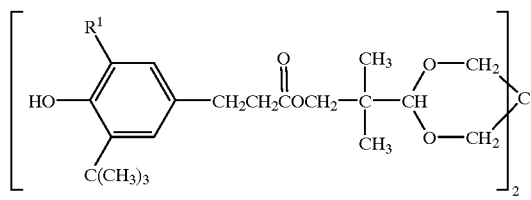

(1)

In formula (1), $R^1$ represents an alkyl group having 1 to 3 carbon atoms.

In the hydroxylphenylpropionate represented by formula (1), $R^1$ represents a methyl group, an ethyl group, or a propyl group but is preferably a methyl group from the standpoint of heat stability and oxidation resistance. Specific examples of the hydroxyphenylpropionate include 3,9-bis[2-[3-(3-t-butyl-4-hydroxy-5-methylphenyl)propionyloxy]-1,1-dimethylethyl]-2,4,8, 10-tetraoxaspiro[5.5]undecane, 3,9-bis[2-[3-(3-t-butyl-4-hydroxy-5-ethylphenyl)propionyloxyl]-1,1-dimethylethyl]-2,4,8,10-tetraoxaspiro[5.5]undecane, and 3,9-bis[2-[2-(3-t-butyl-4-hydroxy5-isopropylphenyl)-propionyloxy]-1,1-dimethylethyl]-2,4,8, 10-tetraoxaspiro-[5.5]undecane. Preferred of these is 3,9-bis[2-[3-(3-t-butyl-4-hydroxy-5-methylphenyl)propionyloxy]-1,1-dimethyl-ethyl]-2,4,8,10-tetraoxaspiro[5.5]undecane.

The polyamide composition of the invention comprises 100 parts by weight of the polyamide mixture and from 0.01 to 1.0 part by weight, preferably from 0.01 to 0.5 parts by weight, more preferably from 0.05 to 0.25 parts by weight, of the hydroxyphenylpropionate. If the amount of the hydroxyphenylpropionate incorporated is smaller than 0.01 part by weight, high-temperature retortion may result in a decrease in mechanical properties and prolongation of the film production time tends to result in the generation of gel particles. Even when the hydroxyphenylpropionate is incorporated in an amount exceeding 1.0 part by weight, an improvement in effect corresponding to such a large ester amount cannot be expected, resulting only in an economical disadvantage.

For accomplishing the object of the invention, it is essential to use a polyamide mixture which comprises two or more polyamides differing in terminal group concentration and has a terminal amino group concentration and a terminal carboxyl group concentration in respective specific ranges and to incorporate a specific amount of the specific hydroxyphenylpropionate into the polyamide mixture.

Various additives may be contained in the polyamide composition of the invention as long as such additives do not impair the properties of the composition. Examples thereof include known phenolic antioxidants other than the hydroxyphenylpropionate (B), phosphorus compound antioxidants such as tris(2,4-di-t-butylphenyl) phosphite and tetrakis(2, 4-di-t-butylphenyl)-4,4'-biphenylene phosphite, sulfur compound antioxidants, weathering agents including ultraviolet absorbers, metal soaps such as calcium stearate and magnesium stearate, bisamide compounds such as methylene bisamides and ethylene bisamides, antistatic agents such as poly(oxyethylene)alkylamines, alkyl sulfonates, and quaternary ammonium sulfates, various fillers such as silica, talc, and montmorillonites, antiblocking agents, dyes, and pigments.

The polyamide composition of the invention can be produced by adding the hydroxyphenylpropionate and various optional additives to the polyamide mixture and mixing these ingredients together by a known technique. Examples of usable production methods include a method which comprises dry-blending the polyamide mixture with the hydroxyphenylpropionate by means of a known mixing apparatus, e.g., a tumbler or mixer, to produce the composition, a method which comprises dissolving the hydroxyphenylpropionate in a solvent in which the ester is soluble, spraying the resultant solution over the polyamide mixture, and then evaporating the solvent to produce the composition, and a method comprising melt-kneading the polyamide mixture together with the hydroxyphenylpropionate by means of a known, single- or twin-screw extruder to produce the composition. The polyamide mixture can be easily obtained by blending two or more polyamides differing in terminal group concentration by a known technique such as dry blending or melt blending.

For producing a film from the polyamide composition of the invention, a known process for polyamide film production can be used. Examples thereof include: a casting process which comprises melt-kneading the polyamide composition of the invention with an extruder, extruding the melt in a flat film form with a T-die or coathanger die, casting the extrudate on a casting roll, and cooling the extrudate to produce a film; and a tubular process which comprises extruding a melt of the polyamide composition in a tubular form with a ring die and cooling the tubular extrudate with air or water to produce a film. Although usable in the unstretched state, the film produced is usually used as a stretched film in most cases. Examples of the stretched film include a uniaxially stretched film, a biaxially stretched film formed by simultaneous biaxial stretching, and a biaxially stretched film formed by successive biaxial stretching. These films are produced by known stretching techniques such as, for example, uniaxial stretching with rolls, successive biaxial stretching with a tenter, simultaneous biaxial stretching with a tenter, and tubular-film stretching. Such a stretching step may be conducted subsequently to the production of a polyamide film, or may Age be conducted separately after the polyamide film formed is temporarily wound up.

The stretch ratio of the stretched film varies depending on the intended use of the film. However, in the case of a uniaxially stretched film, the stretch ratio thereof is generally from 1.5 to 5, preferably from 1.8 to 3.5. In the case of a film biaxially stretched with a tenter, the stretch ratio thereof in the film winding direction (machine direction) is generally from 1.5 to 4 and the stretch ratio thereof in the direction perpendicular to the winding direction (transverse direction) is generally from 1.5 to 5. In the case of a biaxially stretched film obtained through tubular-film stretching, the stretch ratios thereof in the machine and transverse directions each are generally from 1.5 to 4.

The film obtained from the polyamide composition of the invention can be used as a laminate with another polymer film, aluminum foil, etc. Examples of the other laminating polymer film include films formed from low-density polyethylene, high-density polyethylene, polypropylene, ethylene/vinyl acetate copolymers, and ionomer resins.

For producing a laminate of the polyamide film with other polymer film(s), a known method can be used. Examples thereof include: a method in which the polyamide film is bonded with one or more other polymer films with an adhesive; and a method in which the polyamide composition and one or more polymers for forming one or more other polymer films are melted and co-extruded from a multilayered orifice through an adhesive resin.

The film obtained from the polyamide composition of the invention has excellent thermal stability and deteriorates little in practical properties upon retortion. Consequently, the film is suitable for use as a material for packaging foods such as uncooked noodles, processed foods, salted vegetables, and meat. The film is especially suitable for use as a packaging material for retort pouch foods.

The polyamide composition of the invention deteriorates little in mechanical properties or transparency even when subjected to high-temperature retortion and can be satisfactorily formed into films. This polyamide composition is suitable for use as a film for food packaging, especially a packaging film for retort pouch foods.

The invention will be explained below in more detail by reference to Examples and Comparative Examples. However, the invention should not be construed as being limited to these Examples. Methods used for synthesizing the polyamides used in the Examples and Comparative Examples are shown below together with the antioxidants used and the methods used for evaluating polyamide films.

1. Syntheses of Polyamide (Nylon)

(1) Synthesis of A-1 (Nylon-6)

Into a 70-liter autoclave were introduced 20 kg of ε-caprolactam, 1.0 kg of water, and 83 g (6.9 meq per mol of the caprolactam) of m-xylylenediamine. The atmosphere in the polymerizer was replaced with nitrogen. Thereafter, the contents were heated to 100° C. and stirred at this temperature so as to keep the reaction system homogeneous. The temperature in the polymerizer was then elevated to 260° C. and the reaction mixture was polymerized for 2 hours with stirring while regulating the internal pressure of the reactor to 17.5 kgf/cm$^2$. Thereafter, the internal pressure was reduced to ordinary pressure over about 2 hours and then to 400 mmHg, and polymerization was conducted at the reduced pressure for further 2 hours. Subsequently, nitrogen was introduced into the autoclave and the internal pressure was returned to ordinary pressure. The resultant reaction mixture was discharged in the form of a strand through a nozzle disposed in a lower part of the reactor, and the strand was cut to obtain pellets. The pellets were immersed in hot water to remove about 10% unreacted monomers by extraction and then vacuum-dried. The polymer thus obtained had a relative viscosity of 2.6, a terminal amino group concentration of $9.7 \times 10^{-5}$ eq/g, and a terminal carboxyl group concentration of $2.3 \times 10^5$ eq/g.

(2) Synthesis of A-2 (Nylon-6)

Into a 70-liter autoclave were introduced 20 kg of ε-caprolactam and 1.0 kg of water. The atmosphere in the polymerizer was replaced with nitrogen. Thereafter, the contents were heated to 100° C. and stirred at this temperature so as to keep the reaction system homogeneous. The temperature in the polymerizer was then elevated to 260° C. and the reaction mixture was polymerized for 2 hours with stirring while regulating the internal pressure of the reactor to 17.5 kgf/cm$^2$. Thereafter, the internal pressure was reduced to ordinary pressure over about 2 hours, and polymerization was conducted at ordinary pressure for further 2 hours in a nitrogen stream while volatilizing water from the reactor. After completion of the reaction, the resultant reaction mixture was discharged in the form of a strand through a nozzle disposed in a lower part of the reactor, and the strand was cut to obtain pellets. The pellets were immersed in hot water to remove about 10% unreacted monomers by extraction and then vacuum-dried. The polymer thus obtained had a relative viscosity of 3.6, a terminal amino group concentration of $4.1 \times 10^{-5}$ eq/g, and a terminal carboxyl group concentration of $4.2 \times 10^{-5}$ eq/g.

(3) Synthesis of A-3 (Nylon-6)

Into a 70-liter autoclave were introduced 20 kg of ε-caprolactam and 1.0 kg of water. The atmosphere in the polymerizer was replaced with nitrogen. Thereafter, the contents were heated to 100° C. and stirred at this temperature so as to keep the reaction system homogeneous. The temperature in the polymerizer was then elevated to 260° C. and the reaction mixture was polymerized for 2 hours with stirring while regulating the internal pressure of the reactor to 17.5 kgf/cm$^2$. Thereafter, the internal pressure was reduced to ordinary pressure over about 2 hours, and polymerization was conducted at ordinary pressure for further 3 hours in a nitrogen stream while volatilizing water from the reactor. After completion of the reaction, the resultant reaction mixture was discharged in the form of a strand through a nozzle disposed in a lower part of the reactor, and the strand was cut to obtain pellets. The pellets were immersed in hot water to remove about 10% unreacted monomers by extraction and then vacuum-dried. The polymer thus obtained had a relative viscosity of 4.4, a terminal amino group concentration of $3.3 \times 10^{-5}$ eq/g, and a terminal carboxyl group concentration of $3.1 \times 10^{-5}$ eq/g.

2. Antioxidants Used

B-1: 3,9-Bis[2-[3-(3-t-butyl-4-hydroxy5-methylphenyl)-propionyloxy]-1,1-dimethylethyl]-2,4,8, 10-tetraoxaspiro-[5.5]undecane; antioxidant manufactured by Sumitomo Chemical Co., Ltd.; trade name, Sumilizer GA-80

B-2: Pentaerythrityl tetrakis[3-(3,5-di-t-butyl-4-hydroxyphenyl)propionate]; antioxidant manufactured by Ciba Specialty Chemicals Inc.; trade name, Irganox 1010

3. Measurement of Relative Viscosity of Polyamide

The relative viscosity $\eta_r$ of a polyamide was measured in accordance with JIS K 6810:1977 in 98% sulfuric acid under the conditions of a polyamide concentration of 1% and a temperature of 25° C.

4. Measurement of Terminal Group Concentrations of Polyamide

The terminal amino group concentration of a polyamide was determined by titrating a solution of 1 g of the polyamide in a phenol/methanol mixed solvent with 0.02 N hydrochloric acid.

The terminal carboxyl group concentration of a polyamide was determined by titrating a solution of 1 g of the polyamide in benzyl alcohol with 0.05 N sodium hydroxide solution.

5. Formation of Film to be Evaluated

One or more polyamides and an antioxidant were fed to a twin-screw extruder (Type TEX 30, manufactured by The Japan Steel Works, Ltd.) and melt-kneaded under the conditions of an extruder barrel temperature of 250° C. and a screw rotational speed of 100 rpm. The resultant composition was pelletized and dried. The pellets were fed to a single-screw extruder (Plabor φ40 Type Ex, manufactured by Research Laboratory of Plastics Technology Co., Ltd.) equipped with a T-die to produce an unstretched polyamide film having a thickness of 100 μm under the conditions of an extruder barrel temperature of 250° C., screw rotational speed of 40 rpm, and cooling roll temperature of 30° C. A sample having a length of 90 mm and a width of 90 mm was cut out of the film and attached to a biaxially stretching machine manufactured by Iwamoto Seisakusho K.K. The sample was simultaneously biaxially stretched at a temperature of 70° C. in a stretch ratio of 2.8 in each direction, and the stretched state was fixed with heating at 210° C. to produce a biaxially stretched film. Sample films to be evaluated were cut out of this biaxially stretched film.

6. Retortion

The unstretched film (150 mm by 150 mm) and stretched film (150 mm by 150 mm) obtained above were placed in an autoclave for retort pouch foods (SR-240, manufactured by Tomy Seiko Co., Ltd.) and treated therewith for 30 minutes under the conditions of a temperature of 135° C., total pressure of 3.2 kg/cm$^2$ (gauge pressure), and partial air pressure of 1.0 kg/cm$^2$.

7. Measurement of Retention of Tensile Strength

Tensile strength was measured in accordance with ASTM D-882.

The retention of tensile strength was determined by calculating the value of [(tensile strength after retortion)/(tensile strength before retortion)]×100(%). The higher the retention of tensile strength, the less the influence of the retortion.

8. Measurement of Haze

Haze, which is a measure of transparency, was determined in accordance with ASTM D-1003 using a direct-reading haze computer (HGM-2DP) manufactured by Suga Test Instruments Co., Ltd. A film was examined for haze before and after retortion, and the change in haze through the retortion was calculated. Change in haze=(haze after retortion)/(haze before retortion)

Examples 1 to 4 and Comparative Examples 1 to 4

One or more polyamides were mixed with an antioxidant according to each formulation shown in Table 1. From the resultant compositions, films to be evaluated were produced by the method described above. The films obtained were examined for tensile strength and haze before and after retortion. In Table 1 are shown tensile strength, haze, and change in haze.

TABLE 1

| Item | | Unit | Ex. 1 | Ex. 2 | Ex. 3 | Ex. 4 | Comp. Ex. 1 | Comp. Ex. 2 | Comp. Ex.3 | Comp. Ex.4 |
|---|---|---|---|---|---|---|---|---|---|---|
| Kind of polyamide | A-1 | wt % | 36 | 36 | 40 | 30 | — | — | — | 36 |
| | A-2 | | — | — | 60 | 50 | 100 | — | 100 | — |
| | A-3 | | 64 | 64 | — | 20 | — | 100 | — | 64 |
| Terminal carboxyl group concentration | | ×10$^{-5}$ eq/g | 3.3 | 3.3 | 3.4 | 3.5 | 4.2 | 3.1 | 4.2 | 3.2 |
| Terminal amino group concentration | | | 5.3 | 5.4 | 6.3 | 5.6 | 4.0 | 3.3 | 4.0 | 5.5 |
| Relative viscosity | | — | 3.57 | 3.59 | 2.98 | 3.29 | 3.60 | 4.40 | 3.60 | 3.57 |
| Anti- oxidant | Kind | — | B-1 | B-1 | B-1 | B-1 | — | — | B-1 | B-2 |
| | Amount | ppm | 1000 | 3000 | 1000 | 1000 | — | — | 1000 | 1000 |
| Tensile strength* | | MPa | 119/119 | 123/123 | 117/115 | 122/120 | 120/5 | 140/20 | 119/80 | 125/105 |
| Retention of tensile strength | | % | 100 | 100 | 98 | 98 | 4 | 14 | 67 | 84 |
| Haze* | | % | 1.9/2.5 | 2.3/3.0 | 2.1/3.0 | 2.1/2.9 | 2.5/6.0 | 2.4/5.9 | 2.4/5.9 | 2.3/6.0 |
| Change in haze | | — | 1.3 | 1.3 | 1.4 | 1.4 | 2.4 | 2.4 | 2.4 | 2.6 |

*Found values of tensile strength or haze before retortion/after retortion

While the invention has been described in detail and with reference to specific embodiments thereof, it will be apparent to one skilled in the art that various changes and modifications can be made therein without departing from the spirit and scope thereof.

What is claimed is:

1. A polyamide composition comprising (A) 100 parts by weight of a polyamide mixture comprising two or more polyamides differing in terminal group concentration and (B) from 0.01 to 1.0 part by weight of a hydroxyphenylpropionate represented by formula (1), wherein the polyamide mixture (A) comprising two or more polyamides differing in terminal group concentration has a terminal amino group concentration of from $2.0 \times 10^{-5}$ to $7.0 \times 10^{-5}$ eq/g and a terminal carboxyl group concentration of from $1.5 \times 10^{-5}$ to $4.0 \times 10^{-5}$ eq/g, the terminal amino group concentration being higher than the terminal carboxyl group concentration,

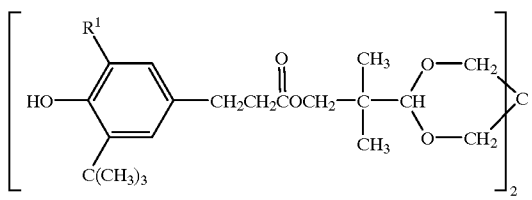

(1)

wherein $R^1$ represents an alkyl group having 1 to 3 carbon atoms.

2. The polyamide composition as claimed in claim 1, wherein the polyamide mixture (A) comprising two or more polyamides differing in terminal group concentration has a relative viscosity of from 2.0 to 5.0.

3. The polyamide composition as claimed in claim 1, wherein the hydroxyphenylpropionate (B) is 3,9-bis[2-[3-(3-t-butyl-4-hydroxy5-methylphenyl)propionyloxy]-1,1-dimethyl-ethyl]-2,4,8,10-tetraoxaspiro[5.5]undecane.

4. A polyamide film for food packaging obtained from a polyamide composition comprising (A) 100 parts by weight of a polyamide mixture comprising two or more polyamides differing in terminal group concentration and (B) from 0.01 to 1.0 part by weight of a hydroxyphenyl-propionate represented by formula (1), wherein the polyamide mixture (A) comprising two or more polyamides differing in terminal group concentration has a terminal amino group concentration of from $2.0 \times 10^{-5}$ to $7.0 \times 10^{-5}$ eq/g and a terminal carboxyl group concentration of from $1.5 \times 10^{-5}$ to $4.0 \times 10^5$ eq/g, the terminal amino group concentration being higher than the terminal carboxyl group concentration,

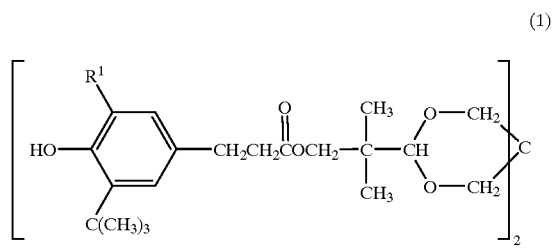

(1)

wherein $R^1$ represents an alkyl group having 1 to 3 carbon atoms.

5. The polyamide film as claimed in claim 4, wherein the polyamide mixture (A) comprising two or more polyamides differing in terminal group concentration has a relative viscosity of from 2.0 to 5.0.

6. The polyamide film as claimed in claim 4, wherein the hydroxyphenylpropionate (B) is 3,9-bis[2-[3-(3-t-butyl-4-hydroxy5-methylphenyl) propionyloxy]-1,1-dimethyl-ethyl]-2,4,8,10-tetraoxaspiro[5.5]undecane.

* * * * *